(12) United States Patent
Yun et al.

(10) Patent No.: US 11,152,974 B2
(45) Date of Patent: Oct. 19, 2021

(54) WIRELESS COMMUNICATION APPARATUS AND METHOD

(71) Applicant: Samsung Electronics Co., Ltd., Suwon-si (KR)

(72) Inventors: Seok Ju Yun, Suwon-si (KR); Sang Joon Kim, Suwon-si (KR); Joonseong Kang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 41 days.

(21) Appl. No.: 16/567,441

(22) Filed: Sep. 11, 2019

(65) Prior Publication Data
US 2020/0136676 A1    Apr. 30, 2020

(30) Foreign Application Priority Data

Oct. 31, 2018  (KR) .................. 10-2018-0131853
Jul. 2, 2019   (KR) .................. 10-2019-0079465

(51) Int. Cl.
*H03L 7/00*    (2006.01)
*H04B 5/00*    (2006.01)
*H04B 13/00*   (2006.01)

(52) U.S. Cl.
CPC ......... *H04B 5/0031* (2013.01); *H04B 5/0012* (2013.01); *H04B 5/0081* (2013.01); *H04B 13/005* (2013.01)

(58) Field of Classification Search
CPC ................................. H03L 7/00; H02J 7/025
See application file for complete search history.

(56) References Cited

U.S. PATENT DOCUMENTS

| | | | |
|---|---|---|---|
| 9,819,395 B2 | 11/2017 | Kerselaers et al. | |
| 9,866,332 B2 | 1/2018 | Oh et al. | |
| 10,009,071 B2 | 6/2018 | Tanaka | |
| 2010/0090770 A1* | 4/2010 | Matsuo | H03B 1/04 331/47 |
| 2011/0070851 A1* | 3/2011 | Casagrande | G04R 20/10 455/131 |
| 2011/0127845 A1* | 6/2011 | Walley | H02J 7/00034 307/104 |

(Continued)

FOREIGN PATENT DOCUMENTS

| CN | 108141191 A | 6/2018 |
|---|---|---|
| KR | 10-2017-0123866 A | 11/2017 |

(Continued)

OTHER PUBLICATIONS

Partial European Search Report dated Feb. 14, 2020 in corresponding European Application No. 19205556.4 (13 pages in English).

(Continued)

*Primary Examiner* — Cindy Trandai
(74) *Attorney, Agent, or Firm* — NSIP Law

(57) ABSTRACT

A wireless communication apparatus may include: an oscillator including a coil assembly exposed to an outside of the wireless communication apparatus, a variable capacitor, and a negative resistor; and a phase locking circuit connected to the coil assembly and the negative resistor. The phase locking circuit may be configured to generate a control signal to lock an oscillation frequency of the oscillator based on an oscillation signal generated by the oscillator, and provide the generated control signal to the variable capacitor.

14 Claims, 12 Drawing Sheets

(56) References Cited

U.S. PATENT DOCUMENTS

| | | | |
|---|---|---|---|
| 2012/0002707 A1 | 1/2012 | Yamasaki | |
| 2014/0073243 A1* | 3/2014 | Hijioka | H04B 5/0037 |
| | | | 455/41.1 |
| 2014/0080409 A1* | 3/2014 | Frankland | H04B 17/104 |
| | | | 455/41.1 |
| 2014/0347006 A1* | 11/2014 | Kim | H02J 7/025 |
| | | | 320/108 |
| 2017/0350169 A1* | 12/2017 | Kubo | E05B 85/10 |
| 2018/0048263 A1* | 2/2018 | Yun | H03L 7/06 |
| 2018/0098182 A1 | 4/2018 | Sydir et al. | |
| 2018/0178059 A1 | 6/2018 | Kim et al. | |
| 2018/0367152 A1* | 12/2018 | Shibata | H03L 7/0994 |

FOREIGN PATENT DOCUMENTS

| | | |
|---|---|---|
| KR | 10-2017-0133264 A | 12/2017 |
| KR | 10-2018-0033468 A | 4/2018 |
| WO | WO 2011/105019 A1 | 9/2011 |

OTHER PUBLICATIONS

Cho, Namjun et al., "A 10.8 mW Body Channel Communication/MICS Dual-Band Transceiver for a Unified Body Sensor Network Controller", *IEEE Journal of Solid-State Circuits*, vol. 44, Issue 12, Dec. 2009 (pp. 3459-3468).

Yun, Seok-Ju et al., "A Wide-Tuning Dual-Band Transformer-Based Complementary VCO", *IEEE Microwave and Wireless Components Letters*, vol. 20, Issue 6, Jun. 2010 (pp. 340-342).

Yun, S-J., et al. "Dual-band transformer resonator oscillator with common-mode gain control". *Electronics letters* 46.9 (2010): 655-657. (2 pages in English).

\* cited by examiner

100

100

1100

WIRELESS COMMUNICATION APPARATUS AND METHOD

CROSS-REFERENCE TO RELATED APPLICATIONS

This application claims the benefit under 35 USC § 119(a) of Korean Patent Application Nos. 10-2018-0131853 and 10-2019-0079465 filed on Oct. 31, 2018 and Jul. 2, 2019, respectively, in the Korean Intellectual Property Office, the entire disclosures of which are incorporated herein by reference for all purposes.

BACKGROUND

1. Field

The following description relates to wireless communication technology.

2. Description of Related Art

With the development of wireless power transmission technology and communication technology such as Bluetooth and near field communication, an electronic device, for example, a mobile communication terminal, requires antenna devices configured to operate in different frequency bands.

When multiple antenna modules are mounted in an electronic device, it is possible to transmit and receive wireless power and wireless signals of various frequency bands and to increase a wireless power transmission rate and a data transmission rate for transmission and reception. However, due to a limited space for mounting the antenna modules, the size of the antenna modules is limited.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a wireless communication apparatus includes: an oscillator including a coil assembly exposed to an outside of the wireless communication apparatus, a variable capacitor, and a negative resistor; and a phase locking circuit connected to the coil assembly and the negative resistor. The phase locking circuit is configured to generate a control signal to lock an oscillation frequency of the oscillator based on an oscillation signal generated by the oscillator, and provide the generated control signal to the variable capacitor.

The coil assembly may include at least one coil.

The at least one coil may be a ring coil.

The at least one coil may include at least one loop. A diameter of the at least one loop may be less than or equal to 2 centimeters (cm).

The oscillator may be configured to oscillate at the oscillation frequency. The oscillation frequency may be determined based on the variable capacitor and a coil included in the coil assembly.

The phase locking circuit may be further configured to compensate for a variation in the oscillation frequency by controlling a capacitance of the variable capacitor in response to a change in impedance of the wireless communication apparatus.

The phase locking circuit may be further configured to restore, in response to the oscillation frequency being changed by a change in capacitance of the coil assembly, the changed oscillation frequency to a target frequency by controlling the variable capacitor.

The wireless communication apparatus may further include: a controller configured to detect a capacitance of the variable capacitor, and determine that at least a portion of the coil assembly is in contact with an external object, in response to the capacitance of the variable capacitor being less than a threshold capacitance.

The controller may be further configured to generate biometric data indicating a biosignal, based on a change in the capacitance of the variable capacitor, after the at least a portion of the coil assembly contacts the external object.

The controller may be further configured to detect a voltage applied to the coil assembly and generate biometric data based on the detected voltage.

The coil assembly may include a plurality of coils. The wireless communication apparatus may further include a phase controller configured to supply the plurality of coils with respective powers designated based on a target bandwidth, in order to communicate through the target bandwidth among a plurality of bandwidths defined based on a number of the plurality of coils.

The phase controller may be further configured to control a phase and a magnitude of current flowing in the plurality of coils with respect to the target bandwidth, in order to communicate through the target bandwidth among the plurality of bandwidths.

The plurality of coils may include a first coil and a second coil. The phase controller may be further configured to supply the first coil and the second coil with power having current of a first phase, in response to the wireless communication apparatus performing communication in a first band, and supply the first coil with power having the current of the first phase and supply the second coil with power having current of a second phase inverted from the first phase, in response to the wireless communication apparatus performing communication in a second band higher than the first band.

The phase controller may be further configured to supply the plurality of coils with respective currents having magnitudes and phases designated based on a body channel, in response to the body channel being selected from the plurality of bandwidths.

The phase controller may be further configured to supply coils among the plurality of coils with respective currents having magnitudes and phases designated based on a wireless channel, in response to the wireless channel being selected from the plurality of bandwidths.

The wireless communication apparatus may further include: a controller configured to select the target bandwidth from the plurality of bandwidths based on whether a contact between the coil assembly an external object is detected.

The phase controller may be further configured to supply coils among the plurality of coils with respective powers designated based on a body channel, in response to the contact between the coil assembly and the external object being detected.

The phase controller may be configured to supply coils among the plurality of coils with respective powers designated based on a wireless channel, in response to the contact between the coil assembly and the external object being not detected.

The wireless communication apparatus may further include: a stimulator configured to supply at least two coils included in the coil assembly with powers, in response to the at least two coils contacting an external object.

The wireless communication apparatus may further include: a receiver configured to process an external signal received through the coil assembly; and a transmitter configured to generate a data signal to be transmitted to the outside of the wireless communication apparatus through the coil assembly.

The wireless communication apparatus may further include: a transmitter configured to generate a data signal to be transmitted to the outside of the wireless communication apparatus through the coil assembly, by controlling the variable capacitor of the oscillator to have a capacitance corresponding to a frequency indicated by a modulation signal in which data is frequency-modulated, based on the modulation signal.

The wireless communication apparatus may further include: a housing configured to accommodate the phase locking circuit and support the coil assembly protruding toward the outside of the wireless communication apparatus.

The wireless communication apparatus may be configured to control phases of powers respectively provided to a plurality of coils included in the coil assembly by switching connections between the negative resistor and the plurality of coils.

The wireless communication apparatus may further include: a receiver configured to detect an envelope of a signal in response to the signal being received from the outside of the wireless communication apparatus through the coil assembly, and restore a data signal from the detected envelope.

In another general aspect, a wireless communication method includes: generating, by a phase locking circuit connected to a coil assembly and a negative resistor of an oscillator, a control signal based on an oscillation signal generated by the oscillator; and locking, by the phase locking circuit, an oscillation frequency of the oscillator by providing the generated control signal to a variable capacitor of the oscillator.

The wireless communication method may further include controlling, by the phase locking circuit, a capacitance of the variable capacitor to compensate for a variation in the oscillation frequency.

The wireless communication method may further include determining, by a controller, whether the coil assembly is in contact with an external object, based on a comparison of a capacitance of the variable capacitor to a threshold capacitance.

The wireless communication method may further include generating, by the controller, biometric data indicating a biosignal, based on a change in the capacitance of the variable capacitor, after determining that the coil assembly is in contact with the external object.

Other features and aspects will be apparent from the following detailed description, the drawings, and the claims.

Figure 1A:
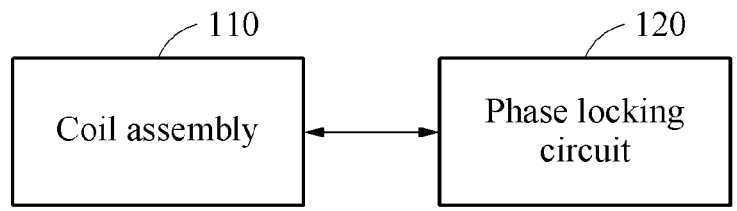
FIGS. 1A and 1B illustrate an example of a configuration of a wireless communication apparatus.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Herein, it is noted that use of the term "may" with respect to an example or embodiment, e.g., as to what an example or embodiment may include or implement, means that at least one example or embodiment exists in which such a feature is included or implemented while all examples and embodiments are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

The features of the examples described herein may be combined in various ways as will be apparent after an understanding of the disclosure of this application. Further, although the examples described herein have a variety of configurations, other configurations are possible as will be apparent after an understanding of the disclosure of this application.

Figure 1B:
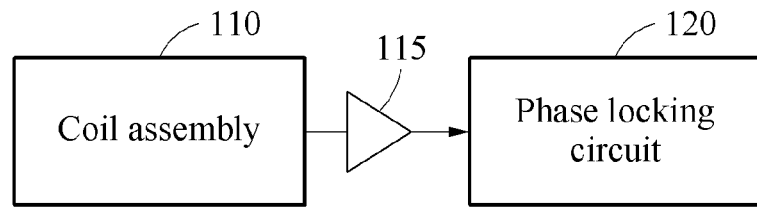

FIGS. 1A and 1B illustrate an example of a configuration of a wireless communication apparatus 100.

Referring to FIG. 1A, the wireless communication apparatus 100 includes a coil assembly 110 and a phase locking circuit 120.

The coil assembly 110 may include at least one coil. The coil assembly 110 is disposed to be exposed to an outside (e.g., an external environment) of the wireless communication apparatus 100. The coil assembly 110 has an inductance. The coils included in the coil assembly 110 may be implemented in a shape of loops, for example, rings. However, the disclosure is not limited to the foregoing example. The coil assembly 110 is connected to a variable capacitor, and a resonant frequency of the coil assembly 110 is determined from the inductance of the coils included in the coil assembly 110 and a capacitance of the variable capacitor. The coil assembly 110 operates as an antenna which communicates using the resonant frequency.

The phase locking circuit 120 is a circuit which locks an oscillation frequency of an oscillator to a target frequency. The phase locking circuit 120 may also be referred to as a phase-locked loop (PLL). The phase locking circuit 120 may be connected to the coil assembly 110, may receive signals from the coil assembly 110, and may lock the oscillation frequency of the oscillator based on the received signals. The phase locking circuit 120 controls the capacitance of the variable capacitor based on the oscillation frequency of the oscillator. For example, the phase locking circuit 120 is implemented as an analog PLL such as an existing charge pump, or a digital PLL including a digital TDC, a loop filter, and a delta sigma modulator (DSM). A frequency/phase detector is implemented, for example, as a time-to-digital converter (TDC). The TDC measures a time difference between pulses and outputs a digital value indicating the time difference. The time difference between pulses corresponds to, for example, an inverse number of the oscillation frequency. The loop filter is a filter which passes an average voltage component, for example, a direct current component, by removing noise and high frequency components from the output of the phase detector. The DSM is a type of digital-to-analog converter (DAC) which calculates an error by approximately predicting a value of a signal, and corrects the error using a cumulative error. However, a configuration of the phase locking circuit 120 is not limited to the configuration described above. Phase locking circuits 120 of various structures may be used.

As shown in FIG. 1B, the wireless communication apparatus 100 further includes an amplifier 115 connected between the coil assembly 110 and the phase locking circuit 120.

The wireless communication apparatus 100 maintains a communication frequency by immediately controlling a variable capacitor of the oscillator through the phase locking circuit 120 connected directly to the coil assembly 110 even when an overall capacitance changes as the coil assembly 110, which is exposed to the outside of the wireless communication apparatus 100, contacts another object having a capacitance, for example, a living body. Thus, the wireless communication apparatus 100 establishes stable radio communication irrespective of a contact with an external object. Hereinafter, the wireless communication apparatus 100 in which sensing, wireless communication, and body communication are implemented by a single input/output port to which the coil assembly is connected will be described.

Figure 2:
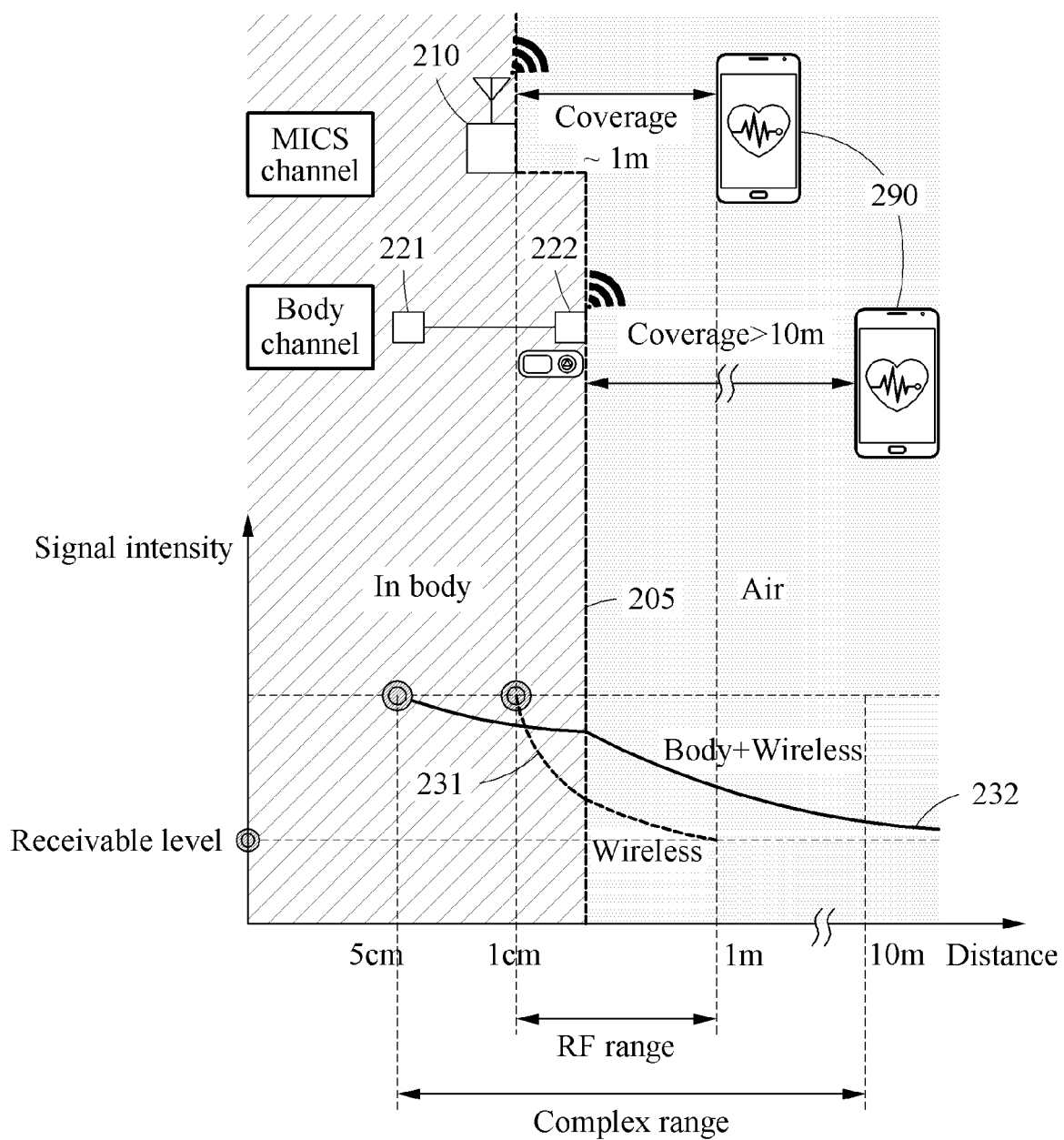
FIG. 2 illustrates an example of a wireless communication environment.

FIG. 2 illustrates an example of a wireless communication environment.

Referring to FIG. 2, a medical implant communication system (MICS) channel is a communication channel used for medical purposes. A band of the MICS channel is, for example, about 400 MHz. However, the disclosure is not limited to the foregoing example. For example, the band may be higher than 400 MHz. A coverage distance, or "coverage," for communication between a wireless communication apparatus 210 implanted into a living body using the MICS channel and the external device 290 may be about 1 meter (m).

A body channel is a communication channel used by a device implanted into a body, for example, a human body. A frequency band of the body channel is, for example, about 100 MHz or lower. However, a frequency band of a body channel is not limited to this example. A first wireless communication apparatus 221 using a body channel establishes communication with a second wireless communication apparatus 222 using the same body channel. The second wireless communication apparatus 222 also establishes communication with the external device 290 using the MICS channel described above. Communication through the MICS channel outside a human body may be established even in a range beyond 10 m.

As shown in FIG. 2, an intensity 231 of a signal transmitted by the wireless communication apparatus 210 is attenuated sharply in a body. As a depth to which the wireless communication apparatus 210 is implanted into the body increases, the coverage decreases relatively more. In the example of FIG. 2, the coverage to a minimum receivable level is shown as about 1 m. However, the disclosure is not limited to this example.

Communication between the first wireless communication apparatus 221 and the second wireless communication apparatus 222 is established through a signal having a frequency corresponding to the body channel, and thus an intensity 232 of the corresponding signal is less attenuated even in the body. The intensity 232 of the signal transmitted by the second wireless communication apparatus 222 disposed on a surface 205 of a human body may be greater than the minimum receivable level up to a range of about 10 m from the second wireless communication apparatus 222.

So as to maintain stable communication even when implanted into a body or mounted outside the body or detached from the body, the wireless communication apparatus 210, the first wireless communication apparatus 221, and the second wireless communication apparatus 222 are implemented in structures which will be described below with reference to FIGS. 3 through 11.

Figure 3:
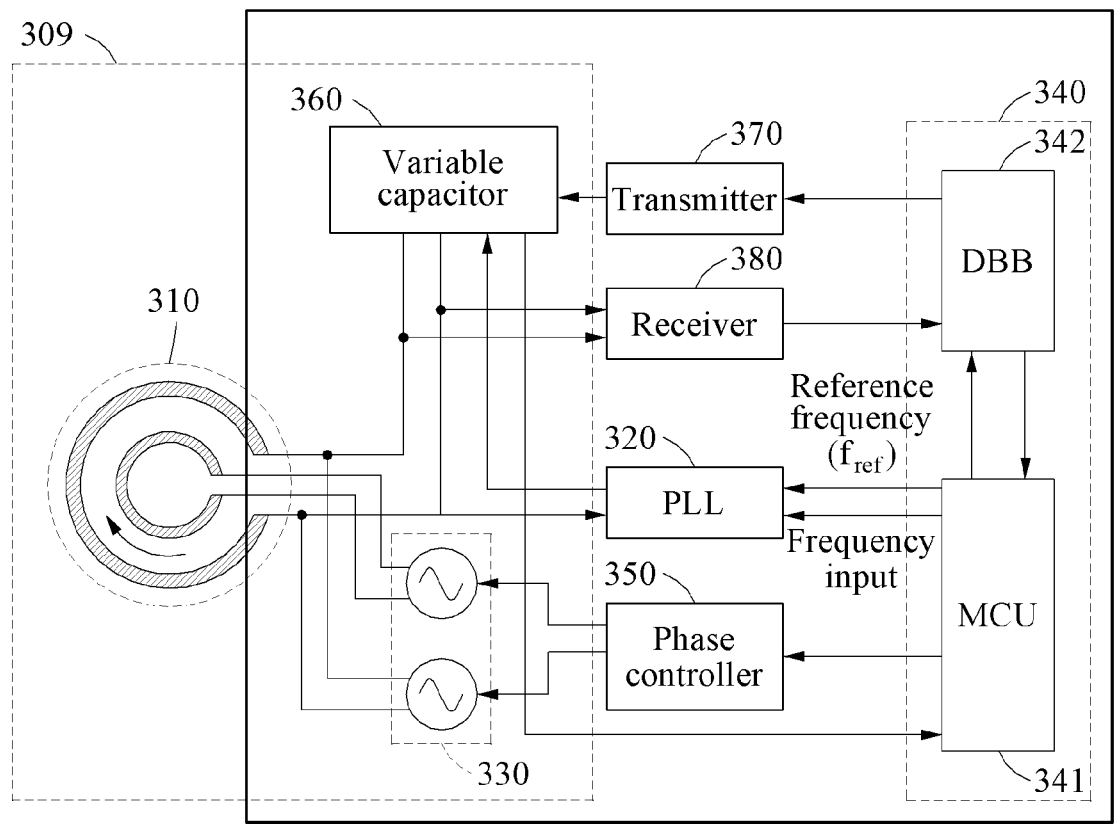
FIG. 3 illustrates an example of a configuration of a wireless communication apparatus.

FIG. 3 illustrates an example of a configuration of a wireless communication apparatus 300.

Referring to FIG. 3, a wireless communication apparatus 300 includes an oscillator 309, a phase locking circuit 320, a controller 340, a transmitter 370, and a receiver 380. The oscillator 309 includes a coil assembly 310, a negative resistor 330, and a variable capacitor 360. In FIG. 3, a capacitance of the variable capacitor 360 is indicated as $C_T$.

The coil assembly 310 is exposed to an outside of a housing of the wireless communication apparatus 300, as described above with reference to FIG. 2. The coil assembly 310 is supported by the housing. The housing accommodates the phase locking circuit 320 and supports the coil assembly 310 protruding toward the outside of the housing. The coil assembly 310 is connected to the phase locking circuit 320, the negative resistor 330, and the variable capacitor 360.

The phase locking circuit 320 is connected to the coil assembly 310 and the negative resistor 330, as described above with reference to FIG. 2. The phase locking circuit 320 is connected to both ends of coils of the coil assembly 310. For example, the phase locking circuit 320 is directly connected to one end of the coil assembly 310, and connected to the other end of the coil assembly 310 through the variable capacitor 360. An oscillation signal of the oscillator 309 is transmitted to the phase locking circuit 320, and an oscillation frequency of the oscillation signal varies based on a signal received from the outside of the housing, and a signal sensed from an object in contact with a coil. The phase locking circuit 320 generates a control signal to lock the oscillation frequency of the oscillator 309 based on the oscillation signal generated by the oscillator 309.

The phase locking circuit 320 locks the oscillation frequency to a target frequency by providing the generated control signal to the variable capacitor 360. The phase locking circuit 320 compensates for a variation in the oscillation frequency by controlling the capacitance of the variable capacitor 360 in response to a change in the impedance of the wireless communication apparatus 300. For example, the phase locking circuit 320 determines the target frequency based on a reference frequency $f_{ref}$ provided from the controller 340, and locks the oscillation frequency to the target frequency. The phase locking circuit 320 restores, in response to the oscillation frequency being changed by a change in capacitance of the coil assembly 310, the changed oscillation frequency to the target frequency by controlling the variable capacitor 360.

The oscillator 309 oscillates at the oscillation frequency determined based on coils included in the coil assembly 310 and the variable capacitor 360. For example, the negative resistor 330 is connected to the coil assembly 310 and the variable capacitor 306. The oscillator 309 generates the oscillation frequency based on the negative resistor 330, the coil assembly 310, and the variable capacitor 360. The oscillation frequency of the oscillator 309 is determined based on an inductance of the coil assembly 310 and a capacitance of the capacitor connected to the coil assembly 310. When the coil assembly 310 includes a single coil, the oscillator 309 may be implemented in a simple oscillation structure including the coil having an inductance, the variable capacitor 360 having a capacitance, and an operational amplifier as the negative resistor having a negative resistance.

The controller 340 controls the phase locking circuit 320, a phase controller 350, the transmitter 370, and the receiver 380. For example, the controller 340 includes a microcontroller unit (MCU) 341, and a digital baseband (DBB) unit 342. The MCU 341 provides the phase locking circuit 320 with the reference frequency $f_{ref}$. The MCU 341 determines the target frequency to be $K_{FCW}$ times the reference frequency $f_{ref}$. $K_{FCW}$ is a coefficient for setting a communication frequency, and is a real number. The DBB unit 342 processes a signal of a baseband. For example, the DBB unit 342 transmits a signal corresponding to the baseband to the transmitter 370, or receives a signal corresponding to the baseband from the receiver 380.

The variable capacitor 360 is a capacitor connected to the negative resistor 330 in the oscillator 309, and controls a capacitance $C_T$ based on a control signal received from the phase locking circuit 320. For example, the variable capacitor 360 is a capacitor bank including capacitors corresponding to n bits, and the control signal is a digital code including n bits. The digital code is a digital value into which the capacitance of the variable capacitor 360 is converted. The configuration of the capacitor bank will be described with reference to FIG. 4. However, the variable capacitor 360 is not limited to the foregoing example. The variable capacitor 360 may be implemented as various capacitors of which capacitances are controlled based on the control signal generated by the phase locking circuit 320.

The transmitter 370 generates a data signal to be transmitted to the outside of the housing through the coil assembly 310. For example, the transmitter 370 receives data from the controller 340. The transmitter 370 performs frequency modulation on the corresponding data. The transmitter 370 generates the data signal to be transmitted to the outside of the housing through the coil assembly 310, by controlling the variable capacitor 360 of the oscillator 309 to have a capacitance corresponding to a frequency indicated by a modulation signal in which the data is frequency-modulated, based on the modulation signal. The transmitter 370 generates the data signal using, for example, on off keying (OOK), frequency shift keying (FSK), or amplitude shift keying (ASK).

The receiver 380 processes an external signal received through the coil assembly 310. The external signal is a signal modulated using, for example, OOK, FSK, or ASK. The receiver 380 restores the external signal into the data through super-regenerative reception. For example, in response to reception of the external signal through the coil assembly 310, the receiver 380 detects an envelope of the received signal and restores the data signal from the detected envelope.

The wireless communication apparatus 300 performs MICS channel communication and body communication using the coil assembly 310 through the blocks described above, and performs stable communication even when implanted into a human body or mounted outside the human body or detached from the human body. The wireless communication apparatus 300, when implanted into the human body, establishes communication with an external device mounted on the human body or disposed outside the human body. The wireless communication apparatus 300, when mounted on the human body or disposed outside the human body, establishes communication with an external device implanted into the human body or mounted on the human body. Further, the wireless communication apparatus 300 senses an external environment, thereby performing communication or sensing a biosignal by itself using the coil assembly 310, which is exposed to the outside of the housing.

For reference, the coil assembly 310 includes a single coil, as described above. However, the disclosure is not limited to these examples. For example, the coil assembly 310 may include at least two coils. When the coil assembly 310 includes at least two coils, the wireless communication apparatus 300 may further include the phase controller 350. An operation of the phase controller 350 will be described in detail with reference to FIGS. 5 through 9.

Figure 4:
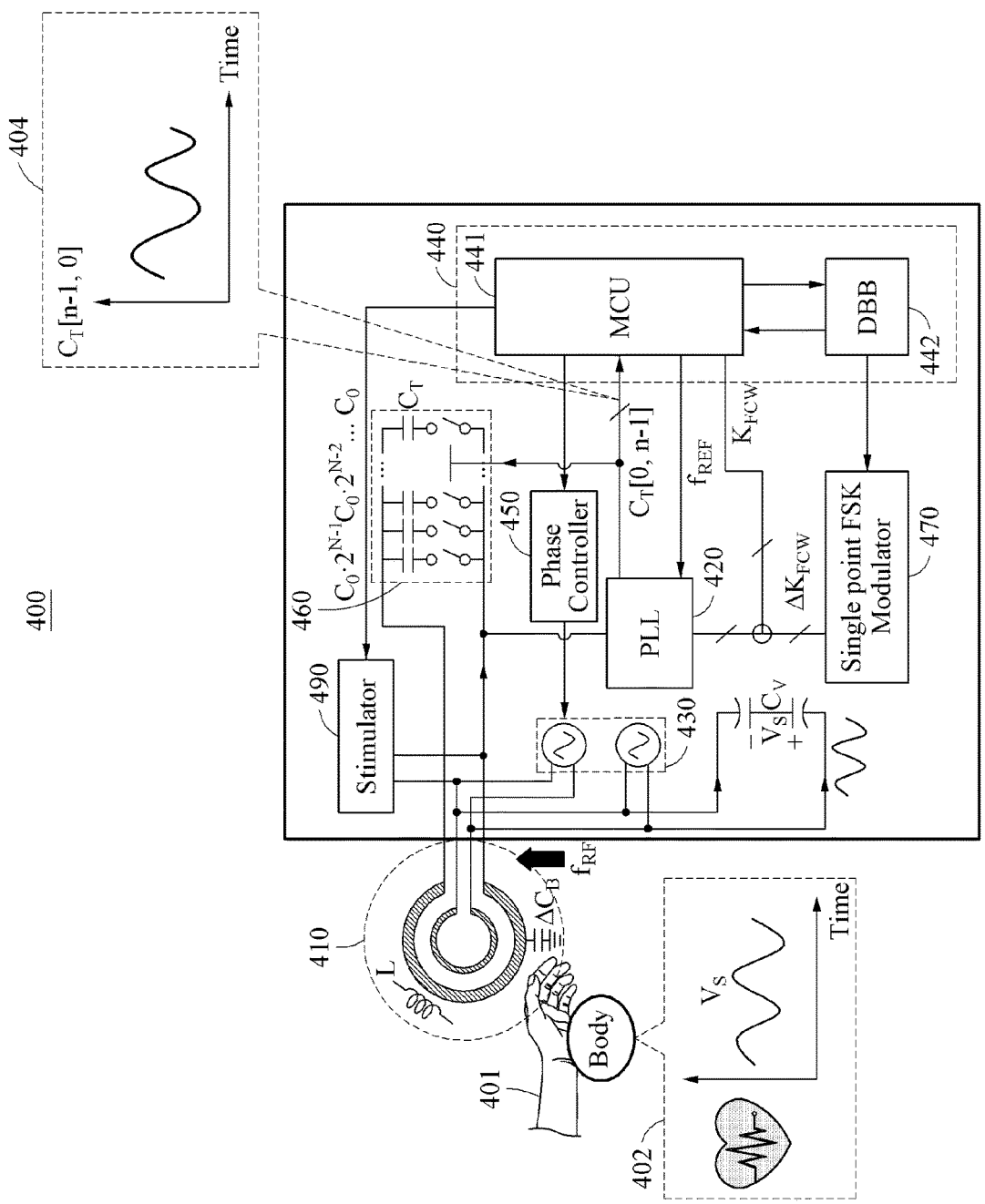
FIG. 4 illustrates an example of an operation of a wireless communication apparatus in a case in which the wireless communication apparatus contacts a human body.

FIG. 4 illustrates an example of an operation of a wireless communication apparatus 400, in a case in which the wireless communication apparatus 400 contacts a human body.

Referring to FIG. 4, the wireless communication apparatus 400 converts a change in an external capacitor contacting a coil, for example, a parasitic capacitor, into a frequency, and converts a change in the frequency into a digital code. Thus, sensing and communication are implemented using a single wireless transceiver block. The wireless communication apparatus 400 detects an external environment by sensing a change in capacitance or impedance by environmental changes such as temperature, humidity, and contact which are external environment change factors. In the following description, the wireless communication apparatus 400 detects whether there is a contact with an external object 401 by detecting a change in capacitance of a variable capacitor 460, and further senses a biosignal 402. The external object 401 may be a living body. However, the external object 401 is not limited to the foregoing example.

First, the wireless communication apparatus 400 maintains an oscillation frequency of an oscillator to be a target frequency even when contacting the external living body 401. The oscillator includes a coil assembly 410, a variable capacitor 460, and a negative resistor 430, similar to the example of FIG. 3. A phase locking circuit 420 locks the oscillation frequency by controlling a capacitance of the variable capacitor 460, hereinafter, the overall capacitance $C_T$, in response to a change in the oscillation frequency of the oscillator.

A controller 440 of the wireless communication apparatus 400 detects the capacitance of the variable capacitor 460, and determines that at least a portion of the coil assembly 410 contacts the external object 401, in response to the capacitance of the variable capacitor 460 being less than a threshold capacitance. When a contact between the external object 401 and the coil assembly 410 is formed, a capacitance of a circuit including the oscillator changes greatly, and the wireless communication apparatus 400 compensates for a change in the capacitance by the contact by greatly changing the capacitance of the variable capacitor 460. Thus, the wireless communication apparatus 400 determines whether there is a contact with the external object 401 through a variation in the capacitance of the variable capacitor 460.

For example, when a contact between the external object 401, for example, the living body, and the coil assembly 410 in the wireless communication apparatus 400 occurs, the coil assembly 410 is electrically connected to a capacitor of the external object 401, for example, a body capacitor. A capacitance of the body capacitor is referred to as a body capacitance $C_B$. In FIG. 4, the body capacitor is added to a circuit of the wireless communication apparatus 400, and the phase locking circuit 420 maintains the oscillation frequency to be the target frequency by compensating for a change in the capacitance by the addition of the body capacitor. Thus, the capacitance of the oscillator changes. The phase locking circuit 420 controls the overall capacitance $C_T$ of a capacitor bank to compensate for the change in the capacitance by the body capacitor. Thus, when the capacitance of the oscillator increases by the body capacitance $C_B$, the phase locking circuit 420 maintains the capacitance of the oscillator by decreasing the overall capacitance $C_T$ of the capacitor bank by the body capacitance $C_B$, for example, $|\Delta C_B|=|\Delta C_T|$. Since the oscillation frequency is locked to the target frequency, the wireless communication apparatus 400 changes the capacitance of the internal capacitor bank in response to a change in an external capacitance. In this example, the target frequency is in a wireless channel band. However, the disclosure is not limited to this example. The target frequency may be in a body channel band. The coil assembly 410 may include a single coil designed for one of multiple channel bands such as a wireless channel band and a body channel band. However, the disclosure is not limited to the provided examples. The coil assembly 410 may include a plurality of coils configured to support multiple channel bands.

Herein, the wireless channel band is an MICS channel, 900 MHz, or Bluetooth low energy (BLE). When the wireless communication apparatus 400 operates in the wireless channel band, the wireless communication apparatus 400 establishes communication with a device implanted into a living body or establishes communication with an external communication terminal, for example, a mobile phone. The body channel band is about 100 MHz, for example. However, the disclosure is not limited to this example. The wireless communication apparatus 400 establishes communication through the body channel band with respect to an implantable device and an attachable device, and establishes communication through the wireless channel band with respect to a terminal outside the human body.

The wireless communication apparatus 400 senses the biosignal 402 by detecting a change in the capacitance after the coil assembly 410 contacts the external object/living body 401.

For example, as shown in FIG. 4, the wireless communication apparatus 400 further includes a varactor capacitor. A capacitance of the varactor capacitor is referred to as a varactor capacitance $C_V$. When the coil assembly 410 includes a single coil, the varactor capacitor is connected to both ends of the coil of the coil assembly 410 and changes the varactor capacitance $C_V$ in response to a change in voltage of the corresponding coil. The voltage applied to the coil corresponds to a voltage applied to both ends of the varactor capacitor, and is referred to as a sensing voltage $V_S$. However, the disclosure is not limited to the case in which the coil assembly 410 includes a single coil. The coil assembly 410 may include a plurality of coils. For example, when the coil assembly 410 includes two coils, the varactor capacitor is connected to both ends of each of the two coils, for example, four nodes.

For reference, a change in magnitude of the varactor capacitance $C_V$ corresponds to a change in voltage of the biosignal 402. A communication frequency of the coil assembly 410 is determined based on an inductance of the coil assembly 410 and a capacitance of a capacitor connected to the coil assembly 410. The communication frequency of the coil assembly 410 may be expressed using circuit components, as given by Equation 1.

$$f_{RF} = \frac{1}{2\pi\sqrt{L(C_T + C_V + C_B)}}$$ [Equation 1]

In Equation 1, $f_{RF}$ is the communication frequency, L is the inductance of the coil assembly 410, $C_T$ is the overall capacitance of the capacitor bank, $C_V$ is the varactor capacitance, and $C_B$ is the body capacitance. The wireless communication apparatus 400 compensates for variations in the varactor capacitance $C_V$ and the body capacitance $C_B$ by controlling the overall capacitance $C_T$ of the capacitor bank, to maintain the communication frequency $f_{RF}$. Since the body capacitance $C_B$ is constant after the coil assembly 410 contacts the living body 401, only the varactor capacitance $C_V$ changes in response to the change in voltage of the biosignal 402. Thus, after the contact with the living body, the phase locking circuit 420 controls the overall capacitance $C_T$ of the capacitor bank only to compensate for the change in the varactor capacitance $C_V$, and the controller 440 generates biometric data by detecting a change in the overall capacitance $C_T$ of the capacitor bank.

The controller 440 generates biometric data indicating the biosignal 402 based on a change in the capacitance of the variable capacitor 460 after at least a portion of the coil assembly 410 contacts the external object 401. An MCU 441 of the controller 440 detects the change in the capacitance of the variable capacitor 460. The MCU 441 detects the change in the capacitance from a control signal 404 output from the phase locking circuit 420. Hereinafter, a relationship between the control signal 404 and the change in the capacitance of the variable capacitor 460 will be described.

The variable capacitor 460 includes the capacitor bank, and the capacitor bank controls the overall capacitance $C_T$ of the capacitor bank based on the control signal 404. For example, when the capacitor bank includes n capacitors, a capacitance of a capacitor corresponding to an i-th bit position from a least significant bit (LSB) is $2^{i-1}C_0$.

In this example, the control signal 404 is an n-bit digital code $C_T[0,n-1]$. A bit value assigned to each bit position of the digital code determines whether to activate a capacitor corresponding to the bit. For example, when the bit value of the i-th bit position in the digital code is "0", the capacitor bank deactivates an i-th capacitor. When the bit value of the i-th bit position in the digital code is "1", the capacitor bank activates the i-th capacitor. The overall capacitance $C_T$ of the capacitor bank is determined to be a sum of capacitances of activated capacitors. For example, when n=3 and the digital code is "101", the capacitance of the capacitor bank is expressed by $C_0(1 \cdot 2^2+0+1 \cdot 2^0)=5 C_0$. $C_0$ denotes a unit capacitance. Thus, the digital code of the control signal 404 indicates a magnitude of the overall capacitance $C_T$ of the capacitor bank.

The phase locking circuit 420 determines a target frequency based on a reference frequency $f_{REF}$ provided from the controller 440 and a frequency control word (FCW) constant $K_{FCW}$. For example, the target frequency is expressed by Equation 2.

$$f_{RF}=f_{REF} \cdot K_{FCW}$$ [Equation 2]

In Equation 2, $f_{RF}$ is the target frequency, which is a communication frequency after locking. $f_{REF}$ is the reference frequency, and $K_{FCW}$ is an FCW, which is a variable to set a communication channel, for example, a body channel or a wireless channel. For example, $f_{REF}$ for an RF of 400.5 MHz is 1 MHz, and $K_{FCW}$ in a wireless channel band is about 400.5. However, the disclosure is not limited to the foregoing example. $K_{FCW}$ is an input value which varies for wireless signal transmission. The MCU 441 of the controller 440 identifies the biosignal 402 based on the control signal 404 output from the phase locking circuit 420. The MCU 441 calculates the digital code based on a variation in external impedance and transmits the calculated digital code to a DBB unit 442. The DBB unit 442 transmits a changed FCW to compensate for a change in the capacitance by the biosignal 402 to an FSK modulator 470. The FSK modulator 470 is, for example, a single point FSK modulator.

The wireless communication apparatus 400 determines whether there is a contact of the coil assembly 410 with a human body from the change in the overall capacitance $C_T$ for compensating for the body capacitance $C_B$, and senses the biosignal 402 from the change in the overall capacitance $C_T$ for compensating for the varactor capacitance $C_V$. A change in voltage of the biosignal 402 corresponds to the control signal 404 for controlling the capacitance, and thus the wireless communication apparatus 400 generates biometric data from the digital code of the control signal 404. The biometric data is data indicating the biosignal 402. Thus, the wireless communication apparatus 400 senses both whether there is a contact of the coil assembly 410 with a living body and the biosignal 402 by detecting the change in the capacitance of the variable capacitor 460.

Further, the controller 440 detects a voltage applied to the coil assembly 410, and generates biometric data based on the detected voltage. Thus, the wireless communication apparatus 400 may sense the biosignal indirectly through the change in the capacitance, or sense the biosignal directly from the voltage applied to the coil assembly 410.

For reference, only sensing of the biosignal by the varactor capacitor is principally described with reference to FIG. 4. However, the disclosure is not limited to the foregoing example. The varactor capacitor may be replaced with a different type of variable capacitor. In addition, the wireless communication apparatus 400 may detect a change in the external environment through a change in capacitance in response to other external environmental factors temperature and humidity. Furthermore, the wireless communication apparatus 400 further includes a stimulator 490, an example of which will be described in detail with reference to FIG. 10. For reference, both ends of the stimulator 490 are connected respectively to different coils.

When the coil assembly 410 includes at least two coils, the wireless communication apparatus 400 may further include a phase controller 450. An operation of the phase controller 450 will be described in detail with reference to FIGS. 5 through 9.

Hereinafter, a coil assembly for supporting multiple communication bands through an additional coil and an operation of a phase controller for operating the coil assembly will be described with reference to FIGS. 5 through 9.

FIGS. 5 through 9 illustrate examples of an operation of a phase controller.

A phase controller 650, 850 (FIGS. 6 and 8, respectively) controls phases of negative resistors 530, 630, 730, 830. For example, the phase controller 650, 850 supplies a plurality of coils included in a coil assembly 510, 610, 710, 810 with powers designated based on a target bandwidth, to perform communication in one of a plurality of bands defined based on the number of the coils. The phase controller 650, 850 supplies the coil assembly 510, 610, 710, 810 with the respective powers, and phases of currents of the respective powers are determined based on the band. The phase controller 650, 850 supplies each coil with power having current of a phase designated based on the corresponding band. For example, in order to communicate through a target bandwidth among a plurality of bands, the phase controller 650, 850 controls a phase and a magnitude of current flowing in the plurality of coils with respect to the target bandwidth. In response to a body channel being selected from the plurality of bands, the phase controller 650, 850 supplies each coil with current of a phase and a magnitude designated based on the body channel. In response to a wireless channel being selected from the plurality of bands, the phase controller 650, 850 supplies each coil with current of a phase and a magnitude designated based on the wireless channel.

For example, when the plurality of coils includes two coils, the phase controller 650, 850 supplies the negative resistors 530, 630, 730, 830 connected to the coils with current of the same phase, or supplies the negative resistors 530, 630, 730, 830 with current of an inverted phase. An oscillation frequency of an oscillator changes through the current phase-controlled by the phase controller 650, 850. For reference, FIG. 3 illustrates the negative resistors 330 using two symbols for each of description of the same phase and the inverted phase. However, as described below with reference to FIGS. 6 and 8, the negative resistors 530, 630, 730, 830 may include a single operational amplifier. However, the configuration of the negative resistors 530, 630, 730, 830 is not limited to the above example. The configuration of the negative resistors 530, 630, 730, 830 may vary depending on the number of coils included in the coil assembly 510, 610, 710, 810 and the number of bands to be used.

Figure 5:
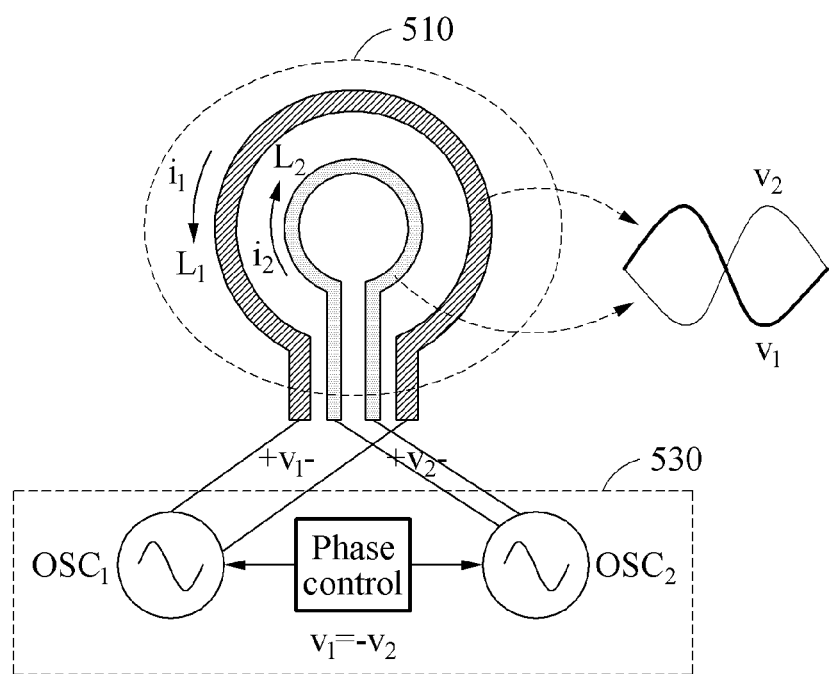
FIGS. 5 through 9 illustrate examples of an operation of a phase controller.
Figure 6:
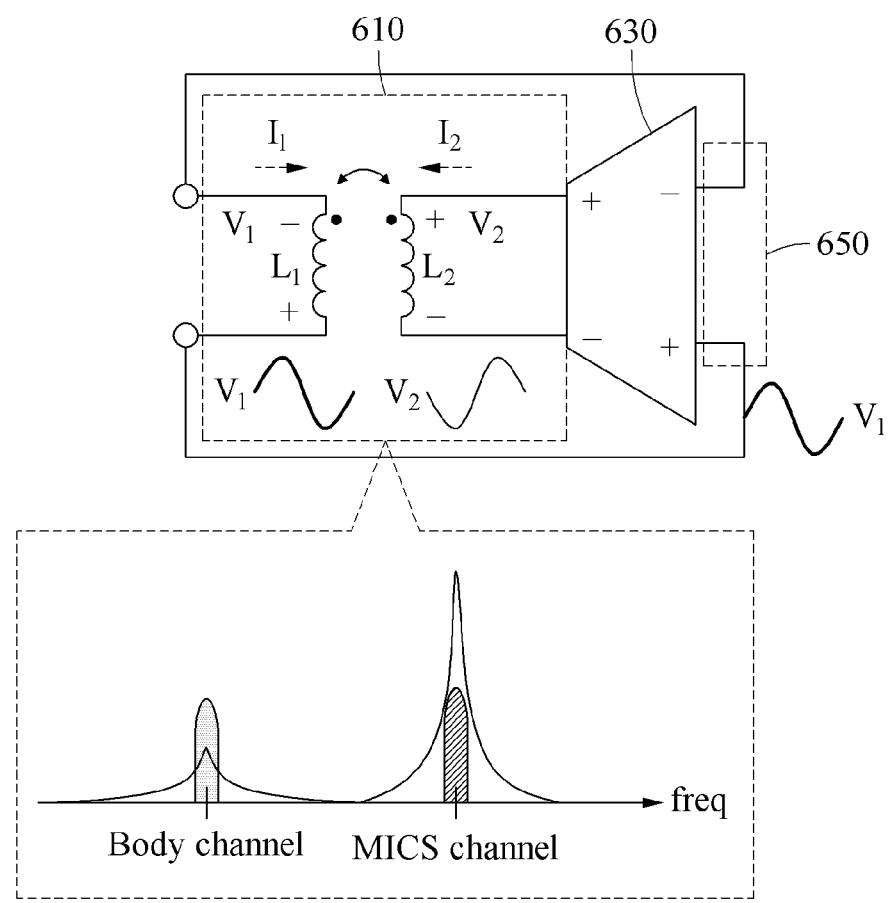

FIGS. 5 and 6 illustrate examples of operations in an inverted phase state.

FIG. 5 illustrates the coil assembly 510 and the negative resistors 530 in a wireless communication apparatus. A phase controller supplies a first negative resistor $OSC_1$ connected to a first coil $L_1$ in the coil assembly 510 with power having a first voltage $v_1$ and a first current $i_1$. The phase controller supplies a second negative resistor $OSC_2$ connected to a second coil $L_2$ in the coil assembly 510 with power having a second voltage $v_2$ and a second current $i_2$. In FIG. 5, the first voltage $v_1$ and the second voltage $v_2$ have an inverted phase relationship, for example, a relationship satisfying $v_1=-v_2$.

FIG. 6 illustrates the phase controller 650 and the negative resistors 630 for operation of an inverted phase state of FIG. 5, and for ease of description, a simplified structure of the coil assembly 610 and the negative resistors 630. More specifically, the coil assembly 510 and the negative resistors 530 connected as shown in FIG. 5 are modeled to a transformer (the coil assembly 610) and an operational amplifier (the negative resistors 630) of FIG. 6. The coil assembly 610 is modeled to the transformer, and a first negative resistor $OSC_1$ and a second negative resistor $OSC_2$ are modeled to the operational amplifier.

The phase controller 650 switches an electrical phase between the negative resistors 630, including the first negative resistor $OSC_1$ and the negative resistor $OSC_2$, and the coil assembly 610. As shown in FIG. 6, for the operation of the inverted phase state, the phase controller 650 forms electrical paths between the negative resistors 630 and the coil assembly 610 such that voltages and currents applied to the first coil $L_1$ and the second coil $L_2$ are in inverted phase. For example, the first negative resistor $OSC_1$ and the second negative resistor $OSC_2$ are modeled to an inverted amplifier, and the phase controller 650 connects a negative output of the inverted amplifier to a start terminal of winding of the first coil $L_1$ and connects a positive output of the inverted amplifier to an end terminal of winding of the first coil $L_1$. In FIG. 6, the start terminal is a terminal marked with a dot phase, and the end terminal is a terminal opposed to the start terminal. For example, nodes at both ends of the coils $L_1$ and $L_2$ are connected to input and output nodes of a circuit such that the entire circuit forms a positive feedback loop. The entire circuit is configured such that an overall phase shift in the positive feedback loop is 360 degrees. In this example, when a phase difference between both ends of the coils is reversed 180 degrees, the overall phase shift of the positive feedback loop is 360 degrees.

The wireless communication apparatus operates the negative resistors 630 connected to the respective coils in the inverted phase state, thereby generating an oscillation frequency of a second band higher than a first band. Thus, the phase controller 650 supplies the first coil with power having current of a first phase and supplies the second coil with power having current of a second phase inverted from the first phase, in response to the wireless communication apparatus performing communication in the second band higher than the first band. In FIG. 6, the first band indicates a body channel, and the second band indicates an MICS channel.

Figure 7:
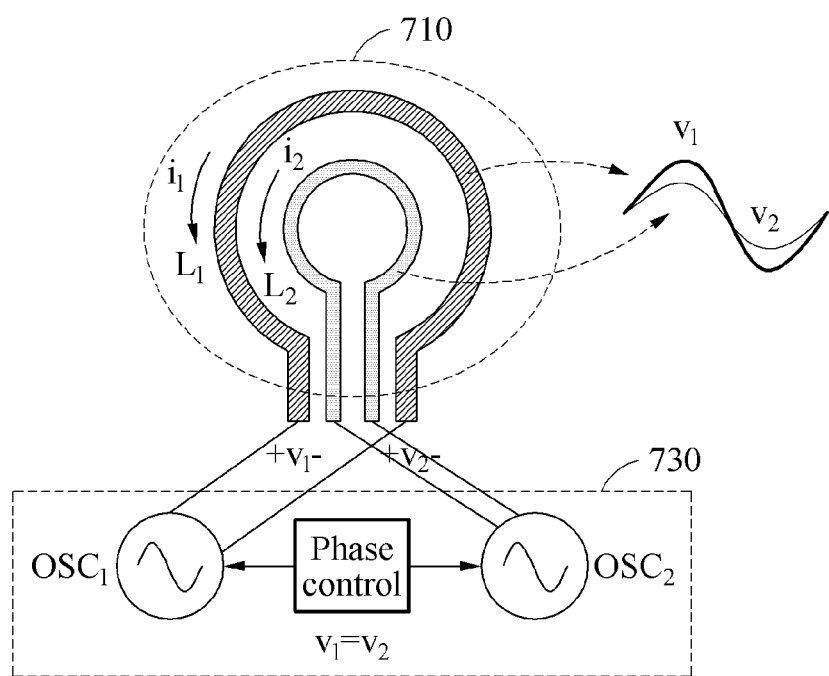
Figure 8:
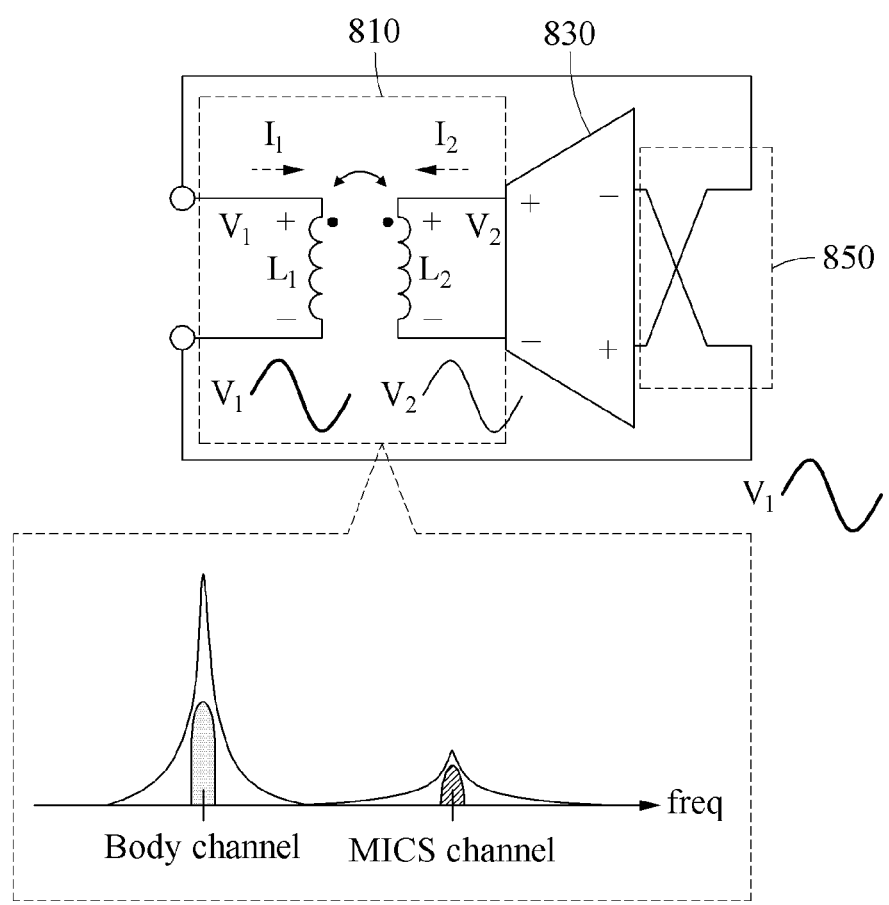

FIGS. 7 and 8 illustrate examples of operations in an identical phase state.

FIG. 7 briefly illustrates the coil assembly 710 and the negative resistors 730 in a wireless communication apparatus, wherein, in contrast to the example of FIG. 5, a first voltage $v_1$ and a second voltage $v_2$ have an identical phase relationship, for example, a relationship satisfying $v_1=v_2$.

FIG. 8 illustrates the phase controller 850 and the negative resistors 830 for operation of an identical phase state of FIG. 7, and for ease of description, a simplified structure of the coil assembly 810 and the negative resistors 830. More specifically, the coil assembly 710 and the negative resistors 730 connected as shown in FIG. 7 are modeled to a transformer (the coil assembly 810) and an operational amplifier (the negative resistors 830) of FIG. 8.

As shown in FIG. 8, for operation of an identical phase state, the phase controller 850 forms electrical paths between the negative resistors 830 and the coil assembly 810 such that voltages and currents applied to a first coil $L_1$ and a second coil $L_2$ are in identical phase. For example, a first negative resistor $OSC_1$ and a second negative resistor $OSC_2$ are modeled to an inverted amplifier, and the phase controller 850 connects a negative output of the inverted amplifier to an end terminal of winding of the first coil $L_1$ and connects a positive output of the inverted amplifier to a start terminal of winding of the first coil $L_1$. For example, nodes at both ends of the coils are connected to input and output nodes of a circuit such that the entire circuit forms a positive feedback loop. The entire circuit is configured to such that an overall phase shift in the positive feedback loop is 360 degrees. In this example, when there is no phase difference between both ends of the coils, for example, when the phase difference is 0 degrees, the overall phase shift of the positive feedback loop is 360 degrees. An oscillation occurs through such a positive feedback loop.

The wireless communication apparatus operates the negative resistors 830 connected to the respective coils in the identical phase state, thereby generating an oscillation frequency of a first band, for example, a body channel band, lower than a second band. Thus, the phase controller 850 supplies the first coil $L_1$ and the second coil $L_2$ with the power having current of a first phase, in response to the wireless communication apparatus performing communication in the first band. In FIG. 8, the first band indicates a body channel, and the second band indicates an MICS channel.

The phase controller 650, 850 described with reference to FIGS. 5 through 8 is a switching device which switches electrical paths between the negative resistors 530, 630, 730, 830 and the coil assembly 510, 610, 710, 810. However, the disclosure is not limited to these examples. The phase controller 650, 850 may be implemented as various circuits which control phases of power to be supplied to the first negative resistor $OSC_1$ and the second negative resistor $OSC_2$.

The wireless communication apparatus controls phases of powers respectively provided to coils included in the coil assembly 510, 610, 710, 810 by switching connections between the coils and the negative resistors 530, 630, 730, 830. As described in FIGS. 5 through 8, when the plurality of coils includes two coils, the wireless communication apparatus switches an oscillation frequency of an oscillator to a low bandwidth or a high bandwidth by controlling phases of currents supplied to oscillators connected to the respective coils.

Figure 9:
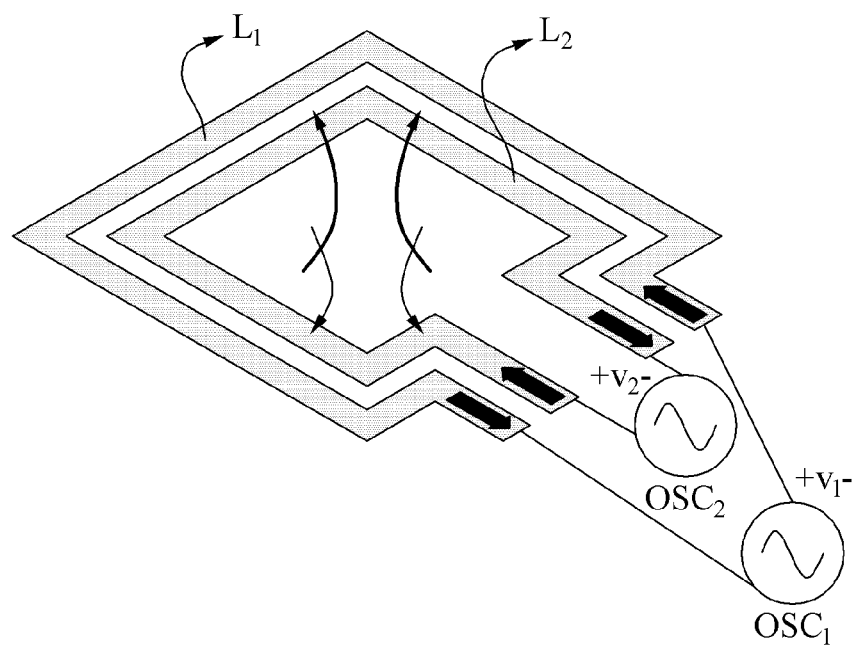

FIG. 9 illustrates an example of an operation in an example in which a coil assembly includes two coils.

Referring to FIG. 9, an overall inductance of a coil assembly in a structure 900 in which the coil assembly includes two coils is expressed based on a direction of current, as given by Equation 3.

$$L_C = (1+k)L_1, L_D = (1-k)L_2 \quad \text{[Equation 3]}$$

In Equation 3, assuming $L_1$ is equal to $L_2$, for example, $L = L_1 = L_2$, $L_C = (1+k)L$ and $L_D = (1-k)L$ are expressed. In Equation 3, $L_C$ is an inductance in an identical phase state, $L_D$ is an inductance in an inverted phase state, and k is a mutual coupling coefficient. When a phase controller allows a flow of currents of the same direction in the coils, an overall inductance of the coil assembly is $L_C$. Conversely, when the phase controller allows a flow of currents of opposite directions in the coils, the overall inductance of the coil assembly is $L_D$.

For reference, phase control of signals applied to two coils extends to control of signal phases of N coils. Here, N is an integer greater than or equal to "2". As the number of coils increases, the number of combinations with respect to directions of currents flowing in the coils also increases. Thus, the number of bands in which the oscillator may oscillate increases based on the number of coils.

For reference, the operation of maintaining the oscillation frequency before the wireless communication apparatus contacts a living body is described above with reference to FIG. 4. The wireless communication apparatus may also switch a band of the communication frequency based on whether there is a contact with the living body, through the operations described with reference to FIGS. 5 through 9.

A controller of the wireless communication apparatus selects a target bandwidth from a plurality of bands based on whether a contact with an external object is detected. The controller controls a phase controller based on the selected target bandwidth to adjust power to be supplied to the coil assembly. For example, the phase controller of the wireless communication apparatus supplies each coil with power designated to the corresponding coil based on a body channel, in response to at least a portion of the coil assembly contacting the external object. Similar to the description provided above, the wireless communication apparatus determines whether there is a contact with the living body through a change in the capacitance of the variable capacitor. Further, the phase controller supplies each coil with power designated to the corresponding coil based on a wireless channel, in response to a contact between the coil assembly and the external object being not detected. That is, the phase controller supplies the coils of the coil assembly with respective powers, and a phase of a current of each of the respective powers is designated based on the wireless channel. Thus, the wireless communication apparatus selectively switches the band of the communication frequency based on whether there is a contact with the living body.

Furthermore, the wireless communication apparatus may sense the biosignal after selectively switching the band of the communication frequency based on whether there is a contact with the living body. Thus, the wireless communication apparatus may also sense the biosignal while performing communication in a communication band in which signal attenuation is minimized, based on whether there is a contact with the living body detected from the change in the capacitance of the variable capacitor.

Figure 10:
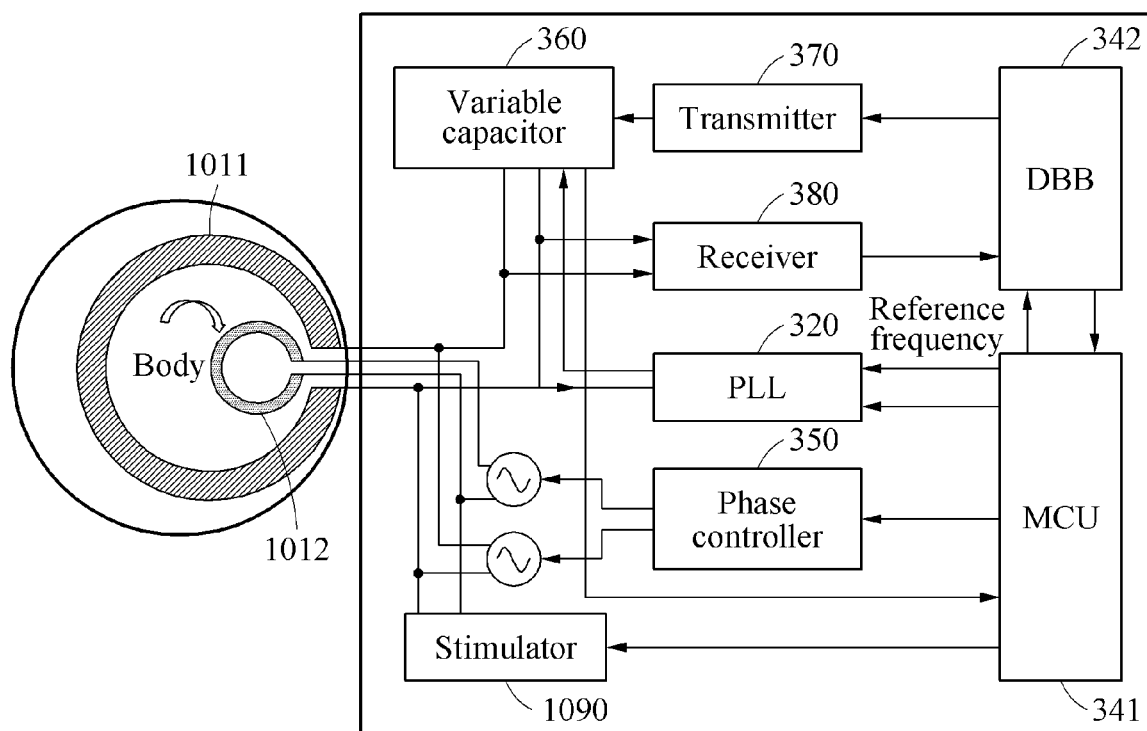
FIG. 10 illustrates an example of an operation of a wireless communication apparatus supplying an object with power.

FIG. 10 illustrates an example of an operation of a wireless communication apparatus 1000 supplying an object with power.

Referring to FIG. 10, the wireless communication apparatus 1000 further includes a stimulator 1090, as described above.

The stimulator 1090 supplies at least two coils 1011, 1012 of a coil assembly with power, in response to the at least two coils 1011, 1012 contacting an external object. In the coil assembly, one coil 1011 operates as a reference electrode, and another coil 1012 operates as a working electrode. Thus, the wireless communication apparatus 1000 applies an electrical stimulation to the external object, for example a living body, through the stimulator 1090. When two coils are provided, the stimulator 1090 is connected to the different coils. For example, one end of the stimulator 1090 is connected to the one coil 1011, and the other end of the stimulator 1090 is connected to the other coil 1012.

Figure 11:
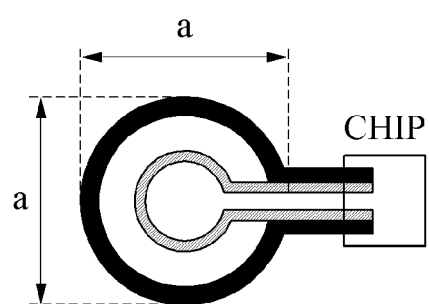
FIG. 11 illustrates an example of implementing a single device of a wireless communication apparatus.

FIG. 11 illustrates an example of implementing a single device of a wireless communication apparatus 1100.

Figure 12:
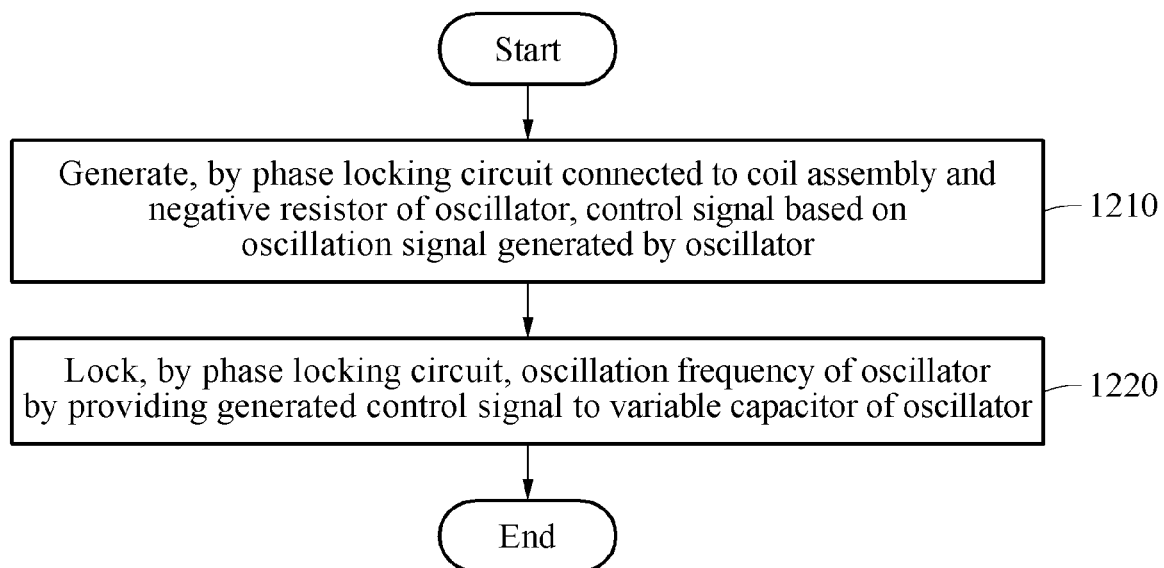
FIG. 12 illustrates an example of a wireless communication method.

Referring to FIG. 11, the wireless communication apparatus 1100 is implemented as a single device including at least one coil and a chip, and thus the wireless communication apparatus 1100 is miniaturized. The at least one coil is a ring coil. The at least one coil is implemented in a form of at least one loop, and a diameter of the loop is less than or equal to 2 cm. For example, a diameter of a biggest coil among the plurality of coils is implemented to be a×a, as illustrated in FIG. 12. For example, a=7 mm. Thus, through the miniature structure, the wireless communication apparatus 1100 selects a communication frequency of multiple bands, senses a contact with a living body, senses a biosignal, or applies an electrical stimulation, without using an additional device, such as an electrode, other than the coils. Since sensing, wireless communication, and body communication are all performed using a single port, an area of the wireless communication apparatus 1100 is minimized. Further, since wireless communication and body communication are implemented using a single structure, the wireless communication apparatus 1100 may operate as an in-body device, and may also operate as a station device connecting an external terminal.

FIG. 12 illustrates an example of a wireless communication method.

Referring to FIG. 12, first, in operation 1210, a phase locking circuit of a wireless communication apparatus generates a control signal based on an oscillation signal generated by an oscillator. The phase locking circuit is connected to a coil assembly and a negative resistor of the oscillator.

In operation 1220, the phase locking circuit locks an oscillation frequency of an oscillator by providing the generated control signal to a variable capacitor of the oscillator. The phase locking circuit locks the oscillation frequency to a target frequency by controlling a variable capacitor, as described with reference to FIGS. 1A through 11.

The wireless communication apparatus is implemented as a multi-mode wireless sensor having an interface in which the coil assembly is disposed outside of a remainder of the apparatus such that the coil assembly is exposed to an external environment. The wireless communication apparatus is applicable to an RF integrated circuit, a wireless sensor system, the Internet of things (IoT), biomedical communication, a stretchable device, an MICS, and impedance sensing, for example.

The controllers 340 and 440, the MCUs 341 and 441, the DBBs 342 and 442, the phase controllers 350, 450, 650, and 850, the transmitter 370, the receiver 380, the FSK modulator 470, and the stimulators 490 and 1090 in FIGS. 3, 4, and 10 that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing 400.

The methods illustrated in FIGS. 4-10 and 12 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A wireless communication apparatus, comprising:
    an oscillator comprising
        a coil assembly exposed to an outside of the wireless communication apparatus,
        a variable capacitor, and
        a negative resistor; and
    a phase locking circuit connected to the coil assembly and the negative resistor, and configured to:
    generate a control signal to lock an oscillation frequency of the oscillator based on an oscillation signal generated by the oscillator;
    provide the generated control signal to the variable capacitor; and
    restore, in response to the oscillation frequency of the oscillator being changed by a change in capacitance of the coil assembly, the changed oscillation frequency of the oscillator to a target frequency by controlling the variable capacitor.

2. The wireless communication apparatus of claim 1, wherein the oscillator is configured to oscillate at the oscillation frequency, and the oscillation frequency is determined based on the variable capacitor and a coil included in the coil assembly.

3. The wireless communication apparatus of claim 1, wherein the phase locking circuit is further configured to compensate for a variation in the oscillation frequency by controlling a capacitance of the variable capacitor in response to a change in impedance of the wireless communication apparatus.

4. The wireless communication apparatus of claim 1, further comprising:
    a controller configured to detect a capacitance of the variable capacitor, and determine that at least a portion of the coil assembly is in contact with an external object, in response to the capacitance of the variable capacitor being less than a threshold capacitance.

5. The wireless communication apparatus of claim 4, wherein the controller is further configured to generate biometric data indicating a biosignal, based on a change in the capacitance of the variable capacitor, after the at least a portion of the coil assembly contacts the external object.

6. The wireless communication apparatus of claim 5, wherein the controller is further configured to detect a voltage applied to the coil assembly and generate biometric data based on the detected voltage.

7. The wireless communication apparatus of claim 1, further comprising:
    a receiver configured to process an external signal received through the coil assembly; and
    a transmitter configured to generate a data signal to be transmitted to the outside of the wireless communication apparatus through the coil assembly.

8. The wireless communication apparatus of claim 1, further comprising:
    a transmitter configured to generate a data signal to be transmitted to the outside of the wireless communication apparatus through the coil assembly, by controlling the variable capacitor of the oscillator to have a capacitance corresponding to a frequency indicated by a modulation signal in which data is frequency-modulated, based on the modulation signal.

9. The wireless communication apparatus of claim 1, wherein the wireless communication apparatus is configured to control phases of powers respectively provided to a plurality of coils included in the coil assembly by switching connections between the negative resistor and the plurality of coils.

10. The wireless communication apparatus of claim 1, further comprising:
    a receiver configured to detect an envelope of a signal in response to the signal being received from the outside of the wireless communication apparatus through the coil assembly, and restore a data signal from the detected envelope.

11. A wireless communication method, comprising:
    generating, by a phase locking circuit connected to a coil assembly and a negative resistor of an oscillator, a control signal based on an oscillation signal generated by the oscillator;
    locking, by the phase locking circuit, an oscillation frequency of the oscillator by providing the generated control signal to a variable capacitor of the oscillator; and
    restoring, in response to the oscillation frequency of the oscillator being changed by a change in capacitance of the coil assembly, the changed oscillation frequency of the oscillator to a target frequency by controlling the variable capacitor.

12. The wireless communication method of claim 11, further comprising controlling, by the phase locking circuit, a capacitance of the variable capacitor to compensate for a variation in the oscillation frequency.

13. The wireless communication method of claim 11, further comprising determining, by a controller, whether the coil assembly is in contact with an external object, based on a comparison of a capacitance of the variable capacitor to a threshold capacitance.

14. The wireless communication method of claim 13, further comprising generating, by the controller, biometric data indicating a biosignal, based on a change in the capacitance of the variable capacitor, after determining that the coil assembly is in contact with the external object.

\* \* \* \* \*